US010185784B2

(12) United States Patent
Yuen et al.

(10) Patent No.: US 10,185,784 B2
(45) Date of Patent: Jan. 22, 2019

(54) COHESIVE RELATED SEARCHES WITH DYNAMICALLY GENERATED TITLES

(71) Applicant: MICROSOFT TECHNOLOGY LICENSING LLC, Redmond, WA (US)

(72) Inventors: Aaron Chun-Win Yuen, Bellevue, WA (US); Arun Sacheti, Sammamish, WA (US); Karim A Hasham, Bellevue, WA (US); Yanfeng Sun, Redmond, WA (US); Jeffrey Lee-Yu Su, Bellevue, WA (US)

(73) Assignee: Microsft Technolgy Licensing, LLC, Redmond, WA (US)

( * ) Notice: Subject to any disclaimer, the term of this patent is extended or adjusted under 35 U.S.C. 154(b) by 399 days.

(21) Appl. No.: 14/925,816

(22) Filed: Oct. 28, 2015

(65) Prior Publication Data
US 2017/0124197 A1   May 4, 2017

(51) Int. Cl.
*G06F 17/30* (2006.01)
(52) U.S. Cl.
CPC .................. *G06F 17/3097* (2013.01)
(58) Field of Classification Search
CPC ....................................................... G06F 17/30
USPC ................................................ 707/706, 737
See application file for complete search history.

(56) References Cited

U.S. PATENT DOCUMENTS

| 7,822,774 | B2 | 10/2010 | Craswell et al. |
| 8,086,600 | B2 * | 12/2011 | Bailey ............... G06F 17/30864 |
| | | | 707/706 |
| 8,239,364 | B2 * | 8/2012 | Wable ............... G06F 17/30867 |
| | | | 707/706 |
| 8,484,192 | B1 * | 7/2013 | Sahami ............. G06F 17/30864 |
| | | | 707/708 |
| 8,631,004 | B2 | 1/2014 | Mishne et al. |
| 8,793,260 | B2 | 7/2014 | Haykal et al. |

(Continued)

OTHER PUBLICATIONS

Blanco, et al., "Entity Recommendations in Web Search", In Proceedings of 12th International Semantic Web Conference, Oct. 21, 2013, 16 pages.

(Continued)

*Primary Examiner* — Kim T Nguyen
(74) *Attorney, Agent, or Firm* — Shook, Hardy & Bacon, L.L.P.

(57) ABSTRACT

Various embodiments described herein are directed to providing cohesive related searches with dynamically generated titles. One or more related queries are retrieved for a search query and are grouped into one or more groupings based on a predefined relationship between the search query and a subset of the related queries. A dynamically generated first title is retrieved for a first grouping from the predefined relationship between the search query and the related queries in first grouping. The first title and the related queries in the first grouping are presented. A selection pivot is provided to select a second grouping, where the selection pivot contains an indicator of the predefined relationship between the search query and the related queries in the second grouping. Upon selecting the second grouping, a dynamically generated second title is retrieved, and the second title and the related queries in the second grouping are presented.

19 Claims, 5 Drawing Sheets

(56) References Cited

U.S. PATENT DOCUMENTS

| | | | | |
|---|---|---|---|---|
| 8,886,625 | B1* | 11/2014 | Dorner | G06F 17/30029 707/706 |
| 8,930,340 | B1* | 1/2015 | Sobol | G06F 17/30864 707/706 |
| 8,977,639 | B2* | 3/2015 | Petrou | G06F 17/30861 707/706 |
| 9,015,139 | B2* | 4/2015 | Wong | G06F 17/30831 707/706 |
| 9,026,509 | B2* | 5/2015 | Melman | G06F 17/3064 707/703 |
| 2011/0078136 | A1 | 3/2011 | Ronen et al. | |
| 2012/0109932 | A1 | 5/2012 | Li et al. | |
| 2013/0232128 | A1 | 9/2013 | Krishnan et al. | |
| 2014/0136536 | A1 | 5/2014 | Ramsey et al. | |
| 2014/0280044 | A1 | 9/2014 | Huynh et al. | |
| 2015/0286684 | A1* | 10/2015 | Heinz | G06F 11/3476 707/769 |
| 2017/0124197 | A1* | 5/2017 | Yuen | G06F 17/3097 |

OTHER PUBLICATIONS

Taylor, Brian, "Google Knowledge Graph: What is it and what are its Functions?", Published on: Dec. 10, 2012, Available at: http://sem-group.net/search-engine-optimization-blog/page/4/.

Yu, et al., "On Building Entity Recommender Systems Using User Click Log and Freebase Knowledge", In Proceedings of Seventh ACM International Conference on Web Search and Data Mining, Feb. 24, 2014, 10 pages.

Bi, et al., "Learning to Recommend Related Entities to Search Users", in Proceedings of the Eighth ACM International Conference on Web Search and Data Mining, Jan. 31, 2015, pp. 139-148.

Sullivan, Danny, "Bing Snapshot Grows to Understand People, Places & Things With "Satori" Expansion", Published on: Mar. 21, 2013, Available at: http://searchengineland.com/bing-snapshots-people-places-things-satori-152460.

Schwartz, Barry, "Google Adds Explanations to Knowledge Graph Associations", Published on: Oct. 22, 2012, Available at: http://searchengineland.com/google-adds-explanations-to-knowledge-graph-associations-137180.

Miliaraki, et al., "From "Selena Gomez" to "Marlon Brando": Understanding Explorative Entity Search", In Proceedings of 24th International World Web Conference, May 18, 2015, pp. 765-775.

Yang, et al., "Search-based Query Suggestion", In Proceedings of the 17th ACM Conference on Information and Knowledge Management, Oct. 26, 2008, 2 pages.

\* cited by examiner

COHESIVE RELATED SEARCHES WITH DYNAMICALLY GENERATED TITLES

BACKGROUND

Search engines provide a user with the ability to search for topics and/or categories of interest. In addition to search results, some search engines have the capability to offer related queries based on the user's current search query. Related queries or suggestions offer a way for a user to refine their current search query or topic, as well as help the user explore other queries or topics that are related to the current search query. However, related queries or suggestions are often displayed unstructured. Each individual query or suggestion may be related to the user's current search query differently, but are presented together in a generic group, e.g., "People also searched for . . . ."

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to providing cohesive related searches with dynamically generated titles. For example, related queries are retrieved for a search query. The related queries are grouped into groupings, where each grouping has a relationship between the search query and a subset of the related queries. A dynamically generated title for one or more of the groupings is retrieved, where the title is descriptive of the grouping and is generated from the relationship between the search query and the related queries belonging to the grouping. The title and the related queries belonging to the grouping can be presented.

In some embodiments, a selection pivot can be provided to select a second grouping, where the selection pivot presents the relationship between the search query and the related queries belonging to the second grouping. When the second grouping is selected, a dynamically generated second title can be retrieved for the second grouping, and the second title and the related queries belonging to the second grouping can be presented.

BRIEF DESCRIPTION OF THE DRAWINGS

Aspects of the invention are described in detail below with reference to the attached drawing figures, wherein.

DETAILED DESCRIPTION

Figure 1:
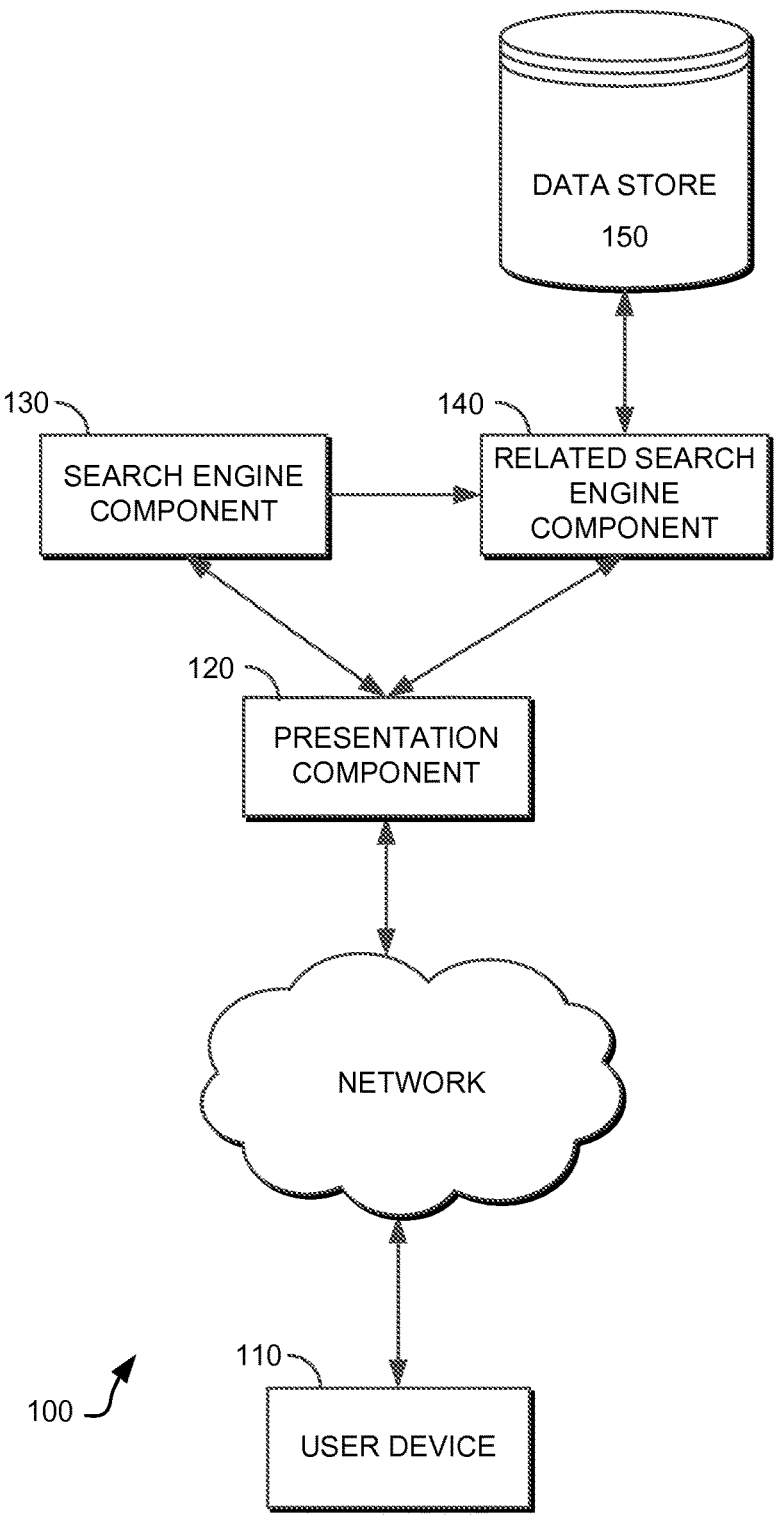
FIG. 1 is a block diagram illustrating an exemplary search environment in which embodiments described herein may be employed.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

An "entity" is defined herein as something the corresponds to a proper noun. For example, a named location, e.g., "Sherwood Forest," could be an entity. However, "trees" is not an entity, since "trees" cannot be identified by a proper noun. An entity can be a person (e.g., Robin Hood), place (e.g., Sherwood Forest), organization (e.g., a specific sports team), a book (e.g., Canterbury Tales), or a movie (e.g., The Wizard of Oz), among others. A term can be both an entity and a non-entity. For example, the book titled "1984" can be an entity, but the year 1984 is not an entity. As another example, the Pope can be an entity, but "pope" is not an entity.

A "non-entity" is defined herein as something that does not correspond to a proper noun, i.e., something that corresponds to a common noun. For example, "automobile" is not an entity since "automobile" does not have a unique identity; i.e., "automobile" can refer to any number of automobiles. "Robin Hood's automobile" would also be a non-entity, since, although "Robin Hood" is an entity, his automobile is a non-entity; i.e., it is unclear as to which of Robin Hood's automobile "Robin Hood's automobile" is referring.

A "pivot" is defined as a user interface element that can be provided to the user enabling the user to switch between different groupings of information. For example, a pivot may be a drop-down menu. When the drop-down menu is selected, multiple groupings may available for a user to select. In some embodiments, once a grouping is selected, the selected grouping is visible while the other groupings are hidden. It should be understood that a pivot is not limited to a drop-down menu and may be any user interface element that allows a grouping to be selected from a plurality of groupings. For example, a pivot can be a group of radio buttons, a link, or a list box, among others. Furthermore, a pivot need not be limited to a single grouping, and multiple groupings may be selected. In some embodiments, a pivot can be used to exclude groupings instead of selecting a grouping. For example, multiple related queries can be presented, and the related queries can be filtered by selecting/unselecting a grouping.

A search engine can provide related queries to help a user find results that they are looking for and to assist the user in exploring additional topics that may be of interest. However, related searches are traditionally displayed unstructured, and so, a user may not be able to identify why a given related query was returned. For example, for the search query "Robin Hood," related queries for the character, names of actors that played Robin Hood, characters in movie and/or book based on Robin Hood, and/or any result with the title Robin Hood may be returned. However, with the various relationships associated with Robin Hood, it may be hard to identify why a given related query was provided for the search query "Robin Hood." For example, "Robert Parker" may appear as a related query. However, without knowing that Robert Parker published a ballad about Robin Hood, the related query may appear random or irrelevant.

Embodiments are directed to providing cohesive related searches with dynamically generated titles. Related queries can be better organized and the user can easily determine why the related queries were presented in the first place, allowing for a more directed approach to search, and saving time and resources for the user. In some embodiments, related queries are grouped by their relationship to the search query. A dynamically generated title is retrieved for a grouping based on the relationship between the related queries of the grouping and the search query. The grouping can be presented to the user with a dynamically generated title so that the user only sees a subset of the related queries and can readily identify their relationship to the search query based on the title. If the user wishes to see a different group of related searches, i.e., grouping, the user can change the grouping via a selection pivot. The newly selected grouping is displayed along with a new dynamically generated title for the grouping.

Referring now to FIG. 1, FIG. 1 illustrates an exemplary search environment 100 in which implementations of the present disclosure may be employed. In particular, FIG. 1 shows a high level architecture of a system for providing cohesive related searches with dynamically generated titles. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The exemplary search environment 100 includes user device 110, presentation component 120, search engine component 130, related search engine component 140, and data store 150. User device 110 can be connected to presentation component 130 via a network. The network may include, without limitation, one or more local area networks (LANs) and/or wide area networks (WANs). User device 110 can be connected via the network on a persisted or an as-needed basis. User device 110 may be any type of computing device, including computing device 500 described with reference to FIG. 5, for example. User device 110 can input search queries and display search results. In some embodiments, user device 110 includes a web browser for displaying a search web page. It should be understood that a web browser displaying a search web page is described for illustrative purposes only, and is not intended to limit the means to view the content of a search. For example, the web search functionality may reside in a separate application from a web browser or be part of a web page with other functionality. The search functionality may also be incorporated into the web browser itself.

Presentation component 120 receives the search query from user device 110 and presents the results from search engine component 130 and related search engine component 140. Presentation component 120 can format the results in a way that is easily viewable on user device 110. For example, presentation component 120 can present a table for the related queries and a pivot to select the contents of the table. Presentation component 120 can also dynamically generate a title for a displayed grouping of related queries. In some embodiments, related search engine component 140 can generate the title and send the title to presentation component 120. The dynamically generated title can be based on the relationship between the search query and the related queries for a grouping.

Search engine component 130 receives the search query from user device 110 and processes the search query for search results. Search engine component 130 can also track user behavior to provide additional services. For example, search engine component 130 can track the user behavior to provide better search results and to identify relationships between the search query and search results.

Related search engine component 140 also receives the search query. Although FIG. 1 shows user device 110 communicating with presentation component 120, it should be understood that user device 110 can also communicate with search engine component 130 and related search engine component 140. The arrows are shown in FIG. 1 for illustrative purposes only, and the actual communication between components may be different. Related search engine component 140 identifies related queries for the search query. The related queries can be identified by their relationship to the search query. In some embodiments, related search engine component 140 retrieves related queries based on a relationship with the search query and not in a similar manner as performed by search engine component 130. In some embodiments, the relationships may be determined by an entity graph. The entity graph can identify an entity related to the search query and its relationship with the search query. For example, if the search query is for an actor, the entity graph can identify other television actors the actor has worked with, other movie actors the actor has worked with, and acquaintances of the actor. The relationships are not confined to the above relationships and can be any relationship identified in the entity graph. For example, the relationships can also be "romantic partners," "children," "family member (siblings)," "movies they've acted in," and "characters they've played" (i.e. what their role was in the movie). Furthermore, the relationship need not come from an entity graph, and can be determined using any other method for determining relationship between entities, between entities and non-entities, and between non-entities and non-entities. Related search engine component 140 can also group the related queries into groupings based on a relationship between the search query and the related queries. For example, the related queries may be tagged with its relationship to the search query, and the grouping can be based on the tags. In some embodiments, when the relationship between the search query and the related queries is determined, the dynamically generated title can also be generated. This dynamically generated title can be stored and retrieved when the related queries are retrieved for a search query.

Data store 250 stores the related query information and the relationships between the related queries and search terms. Data store 250 can store the related queries as suggestion-relationship pairs. The entries of data store 250 can be created from, e.g., the entity graph. Data store 250 can also store other information that can be used to determine relationships with various search terms. For example, if the titles are generated offline, the titles can be stored in data store 250.

Having described various aspects of the search environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Figure 2A:
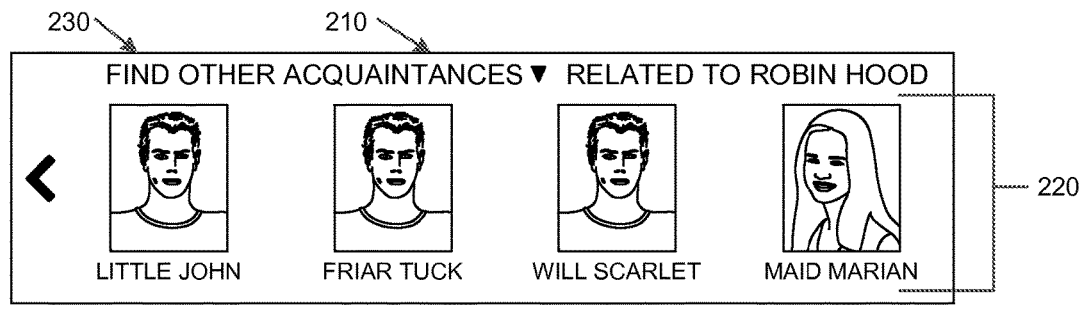
FIGS. 2a and 2b are block diagrams illustrating an exemplary user interface for displaying cohesive related searches with dynamically generated titles, in accordance with embodiments described herein.
Figure 2B:
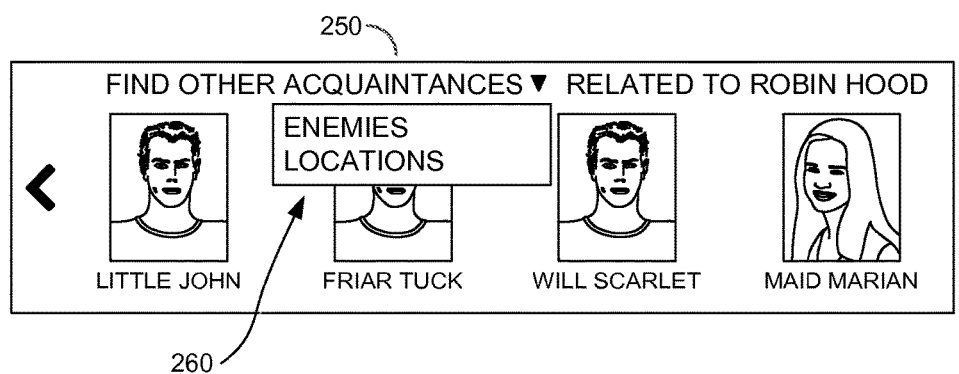

FIGS. 2a and 2b illustrates an exemplary user interface for displaying cohesive related searches with dynamically generated titles, in accordance with an aspect of the present invention. As shown in FIG. 2a, the user interface can include a selection pivot 210 and a grouping of related queries 220. For example, for the search query "Robin Hood," related queries can be "LITTLE JOHN," "FRIAR TUCK," "WILL SCARLETT," and "MAID MARIAN." The related queries may be grouped as acquaintances of Robin Hood, e.g., the related queries may have an acquaintance relationship with Robin Hood, and the selection pivot may display "ACQUAINTANCES" for the grouping. The title 230 for the grouping is also dynamically generated to display the relationship of the grouping to the search query. The title 230 can be generated when the grouping is identified. In some embodiments, the grouping is identified and computed offline, and the pre-computed title is displayed when the grouping is retrieved. As shown in FIG. 2a, the title 230 generated is "FIND OTHER ACQUAINTANCES RELATED TO ROBIN HOOD." A user can easily determine that the grouping of related queries 220 is for acquaintances of Robin Hood. If the user wishes to see other related queries, the user can select the selection pivot 210. As shown in FIG. 2b, the selection pivot 250 can be used to display other selection options 260, i.e., indicators of relationships between the related queries of a grouping and the search query. As shown in FIG. 2b, the other selection options 260 include "ENEMIES" and "LOCATIONS." By selecting one of the other selection options 260, a new grouping corresponding to the selection option can be displayed. Furthermore, the dynamically generated title for the grouping can be retrieved for the new grouping. It should be understood, that the selection options in the selection pivot are indicators of the relationships and may be different from the relations and/or title. For example, if a relationship is "MovieCharacter," the indicator can be "Movie Characters" and the title can be "Find other Movie Characters related to Robin Hood."

In some embodiments, the search query can contain at least one entity and one non-entity. For example, the search query can be "Robin Hood shoes," where "Robin Hood" is an entity and "shoes" is a non-entity. The related queries can include "Friar Tuck shoes," "Little John shoes," "Robin Hood hats," "Robin Hood weapons," etc. A grouping for "acquaintance shoes" can include "Friar Tuck shoes" and "Little John shoes," and a grouping for "Robin Hood items" can include "Robin Hood hats" and "Robin Hood weapons." The predefined relationship between "Robin Hood shoes" and "Robin Hood hats" may be determined to be "items" since shoes and hats may have a relationship of items, and the items are with respect to Robin Hood. In some embodiments, the relationship may be predefined as "Robin Hood items" for "Robin Hood shoes" and "Robin Hood hats," i.e., the relationship between both the entity and non-entity and the related queries can used to determine a grouping.

In some embodiment, the search query can include all non-entities. For example, for the search query "summer shoes," both "summer" and "shoes" are non-entities. The related queries for summer shoes can be "fall shoes," "winters shoes," "spring shoes," "summer hats," "summer foods," etc. The relationships can be "season shoes" for "fall shoes," "winters shoes," and "spring shoe"; and "summer items" for "summer hats" and "summer foods." The selection pivot can include selection options related to at least one term of the search query. For the search term "summer shoes," either "summer" or "shoes" can be fixed and the related queries can be determined for the non-fixed term. For example, if "summer" is fixed, then other summer items can be returned as related queries. It should be understood that "summer shoes" can also be a single term, and related queries for the term "summer shoes" can be returned.

Figure 3:
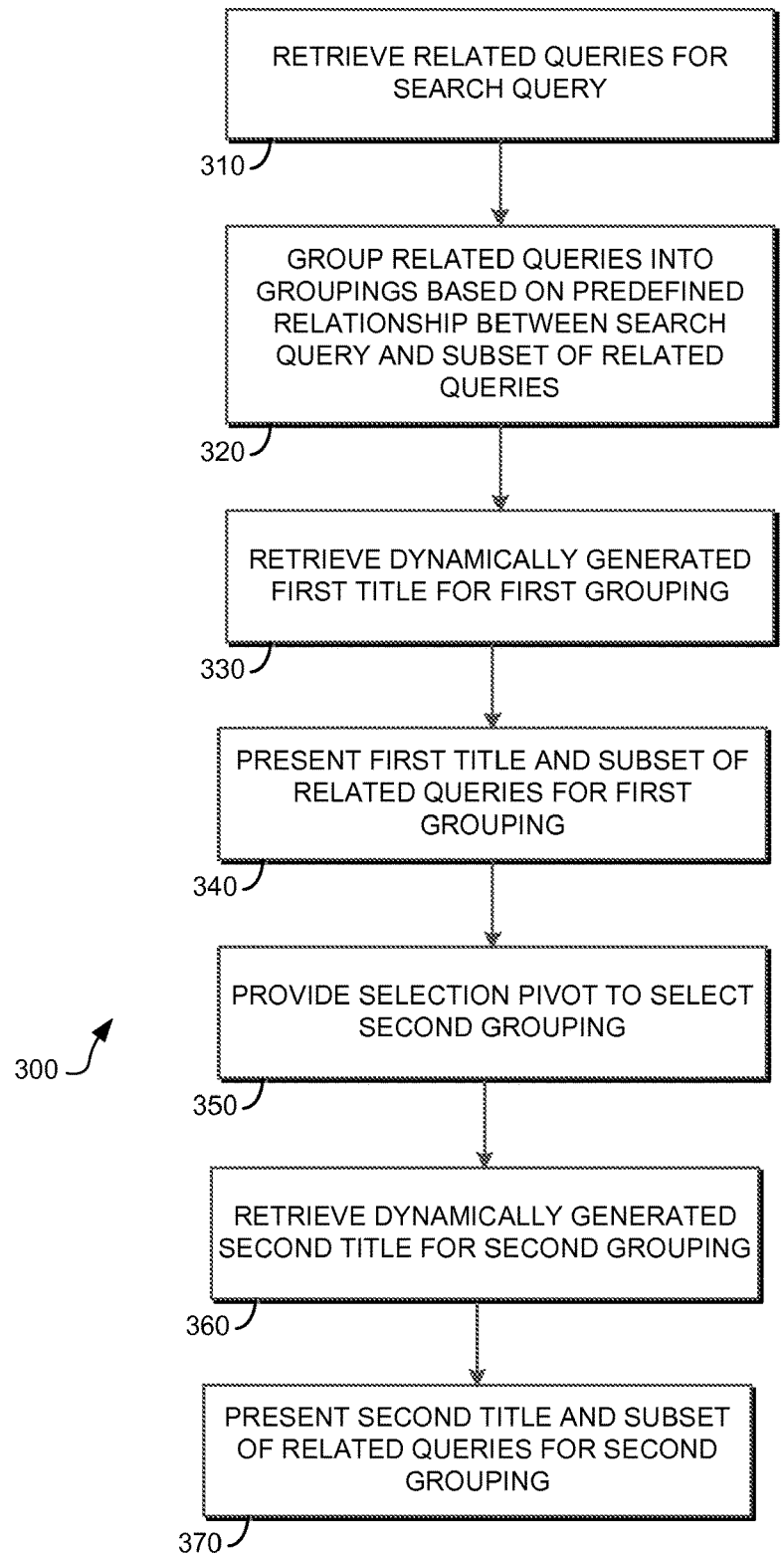
FIG. 3 is a flow diagram illustrating a method for providing cohesive related searches with dynamically generated titles, in accordance with embodiments described herein.

Turning now to FIG. 3, a method 300 for providing cohesive related searches with dynamically generated titles is shown, in accordance with an aspect of the present invention. Method 300 can be performed on one or more servers in a data center or across multiple data centers. In some embodiments, method 400 can be performed on computer device 500 as will be described at FIG. 5.

At step 310, one or more related queries are retrieved for a search query. In some embodiments, the one or more related queries are stored in a data store. When a search query is received, the data store can be searched for the search query or one or more search terms of the search query, and matching results, i.e., related queries, from the data store can be returned. In some embodiments, related queries need not be stored in a data store and are generated from the search query or one or more search terms of the search query. For example, if the search query is a season or contains a season, related queries for other seasons or containing other seasons can be determined for the search query without having the relationship defined in the data store.

At step 320, the one or more related queries are grouped into one or more groupings based on a predefined relationship between the search query and a subset of the related queries. Each of the related queries can have at least one defined relationship with the search query, and related queries having the same relationship can be grouped together. For example, Little John, Friar Tuck, and Will Scarlett may have the same relationship as each other with respect to the search query, e.g., "acquaintances," and may be grouped based on that relationship, e.g., a group for "acquaintances." Furthermore, a related query can have more than one relationship, e.g., spouse and co-actor, and the related query can be grouped into two or more groups based on the different relationships. For example, Little John may be grouped as an acquaintance and as one of Robin Hood's Merry Men. In some embodiments, each of the one or more related queries is tagged with its relationship to the search query. Thus, the grouping can be based on the tags.

At step 330, a dynamically generated first title is retrieved for a first grouping of the one or more groupings. The title describes the relationship of the subset of the related queries grouped into the first grouping with the search query. In some embodiments, the title is generated from the predefined relationship between the search query and the subset of the related queries grouped into the first grouping. For example, for the group "acquaintances," the generated title can be "Related acquaintances of Robin Hood." The first grouping can be determined by any conventional means for selecting a group. For example, the grouping may be ranked, where the highest ranked grouping is the first grouping. In some embodiments, the title can be generated offline prior to receiving a search query.

In some embodiments, the search query can include, e.g., two search terms. For example, the search query "Robin Hood and Little John" includes the search terms "Robin Hood" and "Little John." The related queries can be grouped by their relationship to both search terms. For example, "Friar Tuck" is an acquaintance of Robin Hood and Little John. In some embodiments, the related queries can be grouped by their relationship to one or more of the search terms. For example, "Maid Marian" may only be a related query for Robin Hood. The grouping for Maid Marian can be "acquaintances of Robin Hood," "acquaintances of Robin Hood and not Little John," "acquaintances of Robin Hood and Little John," and/or any grouping that denotes the relationship between the related search and at least one of the search terms.

In some embodiments, the one of the search terms may be an entity and another search term a non-entity. For example, the search query "Robin Hood shoes" includes the entity "Robin Hood" and the non-entity "shoes." The related queries can be grouped by their relationship to at least one of the search terms. Other articles of clothing for Robin Hood may be a grouping for related queries for the search query "Robin Hood shoes." It should be understood that other articles of clothing is only described for illustrative purposes. There may be other predefined relationships for the related queries returned for the search query "Robin Hood shoes." For example, the grouping can be "items belonging to Robin Hood," or "things that are green related to Robin Hood."

In some embodiments, the predefined relationships are stored as metadata. The metadata can be stored as a suggestion-relationship pair. For example, Little John may be stored as "Little John-acquaintance" for the search term "Robin Hood." In some embodiments the predefined relationships are determined from an entity graph. The entity graph can show all of the related terms to the search term and the relationship between the terms. For example, Robin Hood would have connections to Little John and Friar Tuck, with relationship defined between the terms. There may be more than one connection for each term. For example, Robin Hood is an acquaintance of Little John, but is also an opponent, fellow outlaw, etc. Each of these relationships can be captured as a predefined relationship and used for grouping the related searches into groupings.

At step 340, the first title and the subset of the related queries grouped into the first grouping are presented. The first title can appear over the subset of the related queries grouped into the first grouping to identify the relationship to the search query. In some embodiments, the first title and the subset of the related queries grouped into the first grouping are displayed in a separate portion of a web page from the returned search results. The first title and the subset of the related queries grouped into the first grouping may be displayed in such a way that the user can readily identify the portion of the web page containing the related queries.

At step 350, a selection pivot is provided to select a second grouping of the one or more groupings. The selection pivot contains an indicator of the predefined relationship between the search query and the subset of the related queries grouped into the second grouping. The selection pivot may contain indicators of additional predefined relationships, allowing the user to select any of the groupings of related queries. For example, the selection pivot may contain an indicator as a selection option for enemies of Robin Hood, e.g., "ENEMIES" and locations associated with Robin Hood, e.g., "LOCATIONS". If the user wishes to view enemies of Robin Hood, the user can select that option in the selection pivot. In some embodiments, the selection pivot may not contain indicators for all of the predefined relationship and instead may determine the most likely relationships based on a rank or some other selection factor.

In some embodiments, the search queries can include, e.g., two search terms. The selection pivot can present an indicator of the predefined relationship between at least one of the two search terms and the subset of the related queries grouped into the second grouping. For example, if "Maid Marian" is only a related query to Robin Hood and not Little John, the selection pivot can present a selection option for "acquaintances of Robin Hood" and/or "acquaintances of Robin Hood but not Little John." The selection pivot can also present a selection option for "acquaintances of Robin Hood and Little John," without needed to distinguish which of the search terms the predefined relationship belongs to.

At step 360, a dynamically generated second title is retrieved for the second grouping. The title describes the relationship of the subset of the related queries grouped into the second grouping with the search query. In some embodiments, the title is generated from the predefined relationship between the search query and the subset of the related queries grouped into the second grouping. For example, if the user selects the group "locations," the generated title can be "Related locations associated with Robin Hood." In some embodiments, since the title is dynamically generated from the predefined relationship between the search query and the subset of the related queries, the title need not follow the same format as other titles, and can be generated so that the title that is more description or easier to understand. For example, if the selection option is "ACTORS," the title can be "Related actors who played Robin Hood."

At step 370, the second title and the subset of the related queries grouped into the second grouping are presented.

Figure 4:
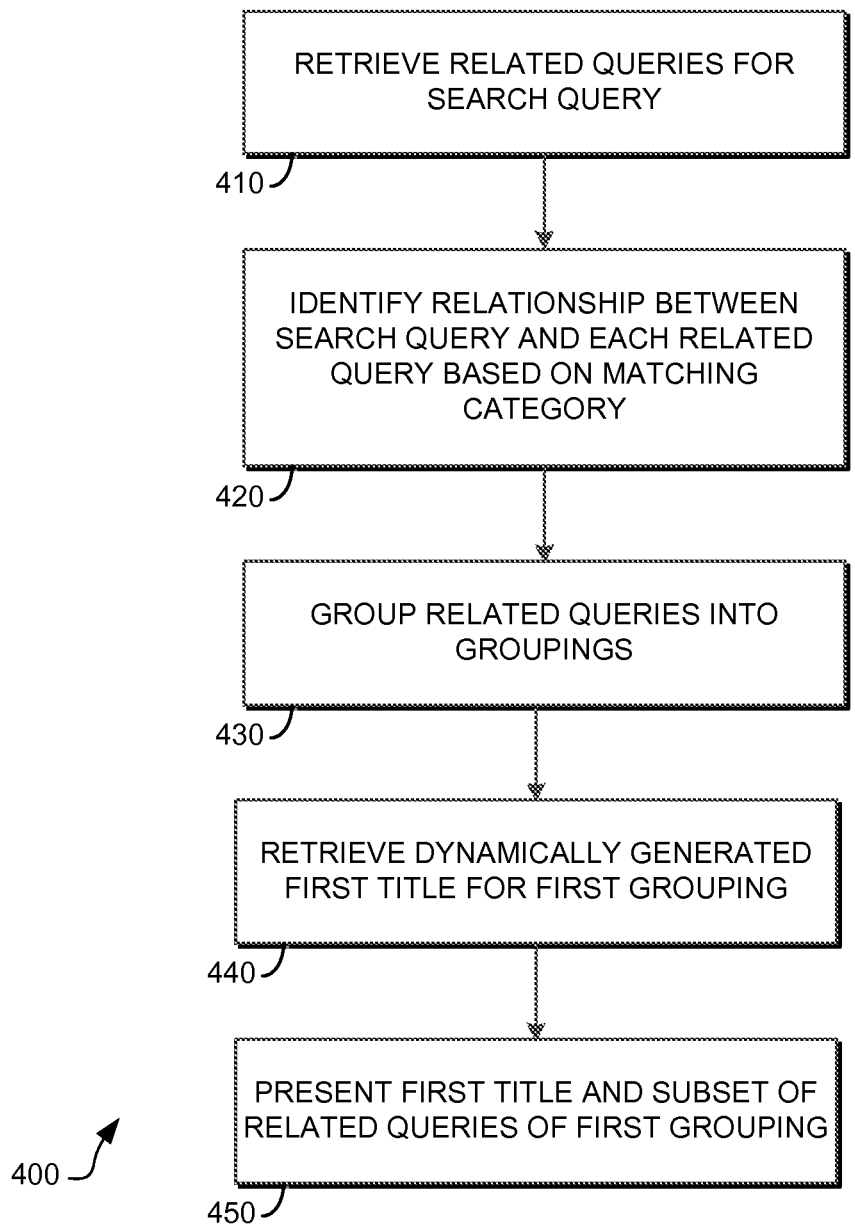
FIG. 4 is a flowchart illustrating another method providing cohesive related searches with dynamically generated titles, in accordance with an embodiments described herein.

Turning now to FIG. 4, another method 400 for presenting cohesive related searches with dynamically generated titles is shown, in accordance with another aspect of the present invention. Method 400 can be performed on one or more servers in a data center or across multiple data centers. In some embodiments, method 400 can be performed on computer device 500 as will be described at FIG. 5.

At step 410, one or more related queries are retrieved for a search query, and at step 420, a relationship between the search query and each of the one or more related queries is identified. In some embodiments, the relationship is determined based on a matching context of at least one term in the search query and at least one term in the related query and not previously stored. For example if a search term is "summer," the relationship need not be previously stored. It may be understood that summer is a season and so related queries for other seasons may be retrieved. So, if the search query is for "summer shoes," relationships between the search query and related queries may be "season shoes."

At step 420, the one or more related queries are grouped into one or more groupings based on the relationship between the search query and a subset of the related queries. For example, if the search query is "summer shoes" a related query may be "fall shoes" or "winter shoes." The grouping may be "season shoes." The groupings need not be for only one of the terms and may be for any combination of terms in the search query. For example, another grouping may be for "summer clothing."

At step 430, a dynamically generated first title is retrieved for a first grouping of the one or more groupings. The title describes the relationship of the subset of the related queries grouped into the first grouping with the search query. In some embodiments, the title is generated from the pre-defined relationship between the search query and the subset of the related queries grouped into the first grouping. For example, for the group "other season shoes," the generated title can be "Related shoes for other seasons." The first grouping can be determined by any conventional means for selecting a group. For example, the grouping may be ranked, where the highest ranked grouping is the first grouping.

At step 440, the first title and the subset of the related queries grouped into the first grouping are presented.

A user can select different groupings of related queries for, e.g., a selection pivot. An indication to view a different grouping of related queries can be received. For example, the user may select "summer clothing." A second title for the second grouping can be dynamically generated, e.g., "Other articles of clothing for summer" The first title can be replaced by the second title and the related queries for the first group replaced with the related queries for the second grouping. Thus, only one title and related queries for a single grouping can be presented.

These configurations allow for the organization of related queries for a search query and the creation of dynamically generated titles that more clearly identify the relationships between the related queries and the search query. By providing cohesive related searches with dynamically generated titles, users can find the search results they were searching for, explore topics of interest related to the search query quickly and efficiently, and identify the relationship between related queries and the search query to better inform further search queries as the users engage with the related searches.

Figure 5:
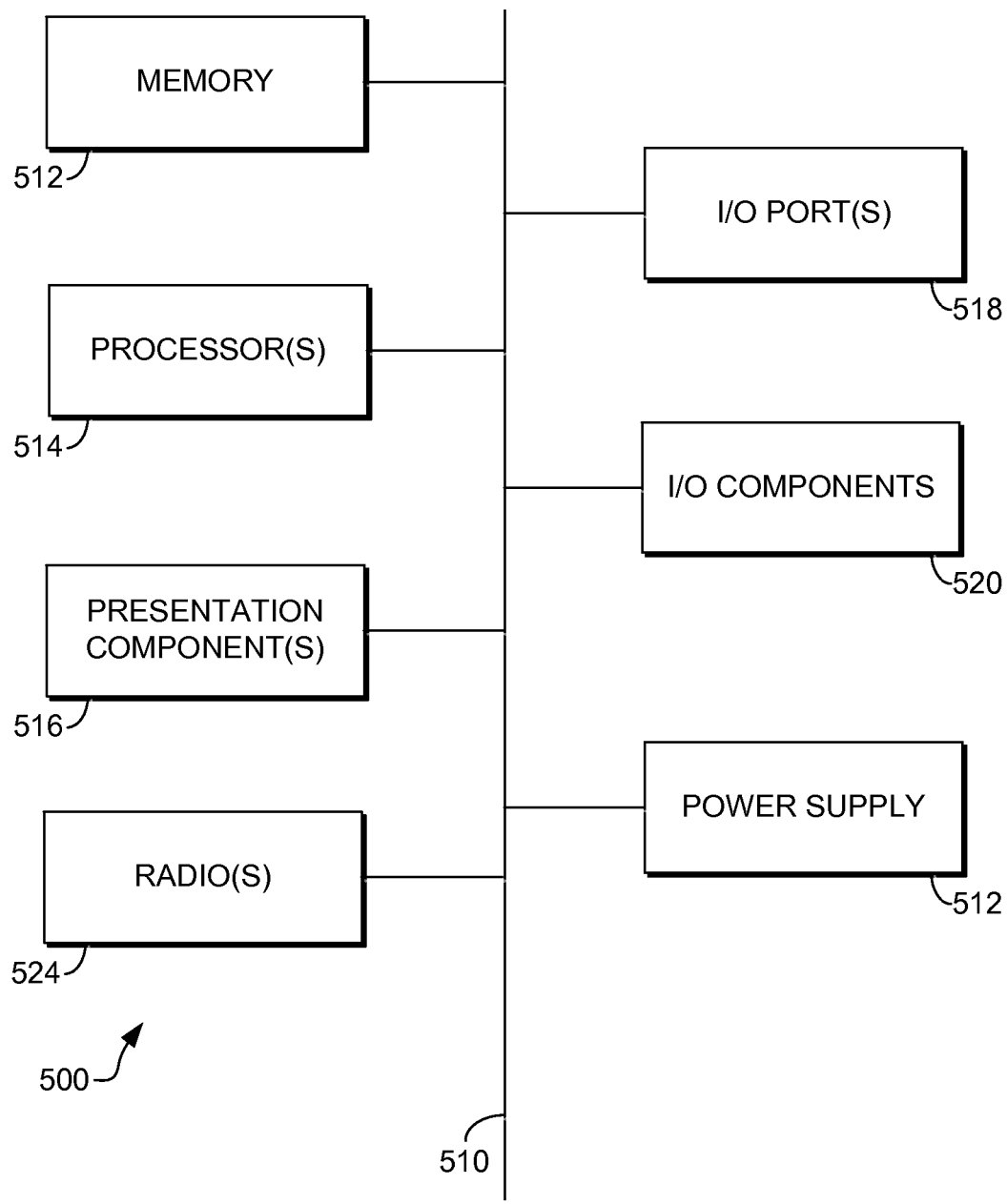
FIG. 5 is a block illustrating of an exemplary computing environment suitable for implementing aspects of the invention.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component 520. Also, processors have memory. The inventors hereof recognize that such is the nature of the art, and reiterate that the diagram of FIG. 5 is merely illustrative of an exemplary computing device that can be used in connection with one or more aspects of the invention. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio. The radio transmits and receives radio communications. The computing device may be a wireless terminal adapted to received communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method for providing cohesive related searches with dynamically generated titles, comprising:

retrieving one or more related queries for a search query;

grouping each of the one or more related queries into one or more groupings, each of the one or more groupings being based on a predefined relationship between the search query and a subset of the related queries, wherein the predefined relationship between the search query and each of the subset of the related queries is determined from an entity graph, wherein the entity graph identifies an entity related to the search query and the predefined relationship of the entity to the search query, causing the predefined relationship of the entity to the search query to be associated with each query in the subset of related queries;

retrieving a dynamically generated first title for a first grouping of the one or more groupings, the first title being generated from the predefined relationship between the search query and a subset of the related queries grouped into the first grouping;

presenting the first title and the subset of the related queries grouped into the first grouping;

providing a selection pivot to select a second grouping of the one or more groupings, an indicator of the predefined relationship between the search query and the subset of the related queries grouped into the second grouping being presented in the selection pivot;

retrieving a dynamically generated second title for the second grouping, the second title being generated from the predefined relationship between the search query and a subset of the related queries grouped into the second grouping; and presenting the second title and the subset of the related queries grouped into the second grouping.

2. The method of claim 1, wherein the retrieving a dynamically generated second title for the second grouping and presenting the second title and the subset of the related queries grouped into the second grouping is in response to receiving a selection of the second grouping in the selection pivot.

3. The method of claim 1, wherein the dynamically generated first title is generated prior to the retrieving one or more related queries for a search query.

4. The method of claim 1, wherein the dynamically generated first title is generated in response to retrieving a dynamically generated first title.

5. The method of claim 1, wherein the search query comprises at least two search terms;
wherein the grouping each of the one or more related queries into one or more groupings is based on a predefined relationship between one of the at least two search terms and a subset of the related queries; and
wherein the providing a selection pivot to select a second grouping of the one or more groupings comprises presenting an indicator of the predefined relationship between the one of the at least two search terms and the subset of the related queries grouped into the second grouping in the selection pivot.

6. The method of claim 1, wherein the search query comprises an entity and a non-entity;
wherein the grouping each of the one or more related queries into one or more groupings is based on a predefined relationship between the non-entity and a subset of the related queries with respect to the entity; and
wherein the providing a selection pivot to select a second grouping of the one or more groupings comprises presenting an indicator of the predefined relationship between the non-entity and the subset of the related queries grouped into the second grouping with respect to the entity in the selection pivot.

7. The method of claim 1, wherein the search query comprises an entity and a non-entity;
wherein the grouping each of the one or more related queries into one or more groupings is based on a predefined relationship between both the entity and the non-entity and a subset of the related queries; and
wherein the providing a selection pivot to select a second grouping of the one or more groupings comprises presenting an indicator of the predefined relationship between both the entity and the non-entity and the subset of the related queries grouped into the second grouping in the selection pivot.

8. The method of claim 1, wherein the predefined relationship between the search query and a subset of the related queries is stored as metadata, the metadata being stored as a suggestion-relationship pair.

9. The method of claim 1, further comprises:
determining the predefined relationship between the search query and each of the subset of the related queries by tags, wherein each of the tags identifies the relationship between the search query and the related query and each of the related queries is tagged with a tag.

10. The method of claim 1, wherein at least one of the one or more related queries is grouped into at least two groupings.

11. The method of claim 1, wherein the first title is descriptive of the subset of the related queries grouped into the first grouping.

12. One or more computer storage media having computer-executable instructions embodied thereon that, when executed, by one or more processors, causes the one or more processors to perform a method for providing cohesive related searches with dynamically generated titles, comprising:
retrieving one or more related queries for a search query;
identifying a relationship between the search query and each of the one or more related queries, the relationship being determined based on a matching category of at least one term in the search query and at least one term in the related query;
grouping each of the one or more related queries into one or more groupings, each of the one or more groupings being based on the relationship between the search query and a subset of the related queries, wherein the predefined relationship between the search query and each of the subset of the related queries is determined from an entity graph, wherein the entity graph identifies an entity related to the search query and the predefined relationship of the entity to the search query, causing the predefined relationship of the entity to the search query to be associated with each query in the subset of related queries;
retrieving a dynamically generated first title for a first grouping of the one or more groupings, the title being generated from the relationship between the search query and the subset of the related queries grouped into the first grouping;
presenting the first title and the subset of the related queries grouped into the first grouping;
receiving an indication to view a different group of related queries;
retrieving a dynamically generated second title for the second grouping, the title being generated from the relationship between the search query and the subset of the related queries grouped into the second grouping; and
replacing the first title and the subset of the related queries grouped into the first grouping with the second title and the second group of related queries.

13. The media of claim 12, wherein the search query comprises at least one non-entity, and wherein the related queries are related to the at least one non-entity.

14. The media of claim 12, wherein the method further comprises:
displaying a first indicator of a first relationship between the first query and the subset of the related queries grouped into the first grouping in a selection pivot;
displaying a second indicator of a second relationship between the second query and the subset of the related queries grouped into the second grouping in the selection pivot;
presenting one of the subset of the related queries grouped into the first grouping and the subset of the related queries grouped into the second grouping based on a selection of one of the first and second indicators.

15. The method of claim 14, wherein the displayed first indicator in the selection pivot is part of the first title.

16. The method of claim 12, wherein the search query comprises at least two terms, and the first title includes one of the at least two terms.

17. A system for providing cohesive related searches with dynamically generated titles, comprising:
one or more hardware processors and memory storing computer-executable instructions and components embodied thereon that, when executed, by the one or more hardware processors, causes the hardware processors to execute:

a related search engine component configured to:

identify one or more related queries for a search query; and group each of the one or more related queries into one or more groupings, each of the one or more groupings being based on a predefined relationship between the search query and a subset of the related queries, wherein the predefined relationship between the search query and each of the subset of the related queries is determined from tags, wherein each of the tags identifies the predefined relationship between the search query and the related query and each of the related queries is tagged with a tag of the tags;

a presentation component configured to:

generate an indicator for each of the one or more groupings, the indicator corresponding to a relationship between the search query and the subset of the related queries grouped into each of the one or more groupings;

store the indicators for the one or more groupings in a selection pivot;

retrieve a dynamically generated first title for a first grouping of the one or more groupings corresponding to one of the indicators, the title being generated from the predefined relationship between the search query and a subset of the related queries grouped into the first grouping;

present the first title and the subset of the related queries grouped into the first grouping, the selected description being part of the first title; and upon receiving a selection of an indicator corresponding to a second grouping in the selection pivot:

retrieve a dynamically generated second title for the second grouping, the second title being generated from the predefined relationship between the search query and a subset of the related queries grouped into the second grouping; and present the second title and the subset of the related queries grouped into the second grouping.

18. The system of claim 17, further comprising a data store, wherein the data store stores a dataset comprising a suggestion and relationship between a search term and the suggestion.

19. The system of claim 18, wherein the search query comprises at least one search term, and wherein the at least one search term corresponds to a record of the data set.

* * * * *